(12) United States Patent
Sobel et al.

(10) Patent No.: US 7,260,847 B2
(45) Date of Patent: Aug. 21, 2007

(54) ANTIVIRUS SCANNING IN A HARD-LINKED ENVIRONMENT

(75) Inventors: William Sobel, Stevenson Ranch, CA (US); Bruce McCorkendale, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 875 days.

(21) Appl. No.: 10/280,663

(22) Filed: Oct. 24, 2002

(65) Prior Publication Data

US 2004/0083381 A1    Apr. 29, 2004

(51) Int. Cl.
G06F 12/14 (2006.01)
G06F 15/00 (2006.01)
H04L 9/00 (2006.01)

(52) U.S. Cl. .................. 726/24; 713/165; 713/166; 713/167; 713/188; 726/1

(58) Field of Classification Search ............ 726/1, 726/24; 707/200–2; 713/188, 165–167
See application file for complete search history.

(56) References Cited

U.S. PATENT DOCUMENTS

| | | | |
|---|---|---|---|
| 5,398,196 A | 3/1995 | Chambers | |
| 5,452,442 A | 9/1995 | Kephart | |
| 5,495,607 A | 2/1996 | Pisello et al. | |
| 5,572,590 A | 11/1996 | Chess | |
| 5,675,710 A | 10/1997 | Lewis | |
| 5,694,569 A | 12/1997 | Fischer | |
| 5,826,249 A | 10/1998 | Skeirik | |
| 5,832,208 A | 11/1998 | Chen et al. | |
| 5,832,527 A * | 11/1998 | Kawaguchi | 707/205 |
| 5,854,916 A | 12/1998 | Nachenberg | |
| 5,884,033 A | 3/1999 | Duvall et al. | |
| 5,944,821 A | 8/1999 | Angelo | |
| 5,974,549 A | 10/1999 | Golan | |
| 6,006,242 A | 12/1999 | Poole et al. | |
| 6,021,510 A | 2/2000 | Nachenberg | |
| 6,023,723 A | 2/2000 | McCormick et al. | |
| 6,052,709 A | 4/2000 | Paul | |

(Continued)

FOREIGN PATENT DOCUMENTS

EP    0636977 A2    2/1995

(Continued)

OTHER PUBLICATIONS

Burchell, Jonathan, "NetShield 1.5", Virus Bulletin, Oxfordshire, England, Aug. 1994, pp. 21-23, XP 000617453.

(Continued)

*Primary Examiner*—David Y Jung
*Assistant Examiner*—William S. Powers
(74) *Attorney, Agent, or Firm*—Fenwick & West LLP

(57) ABSTRACT

Computer-implemented methods, apparati, and computer-readable media for detecting malicious computer code in a file (2) associated with a computer (10). A method of the present invention comprises the steps of determining whether there is more than one hard link (1) to the file (2); and when there is more than one hard link (1), ascertaining the identities of all the hard links (1), and performing an antivirus scan on the file (2) based upon the hard link(s) (1) having the most restrictive scanning criteria of all the hard links (1), or upon the union of scanning criteria amongst all the hard links (1).

36 Claims, 5 Drawing Sheets

U.S. PATENT DOCUMENTS

| | | | |
|---|---|---|---|
| 6,072,942 A | 6/2000 | Stockwell et al. | |
| 6,088,803 A | 7/2000 | Tso et al. | |
| 6,092,194 A | 7/2000 | Touboul | |
| 6,094,731 A | 7/2000 | Waldin et al. | |
| 6,125,459 A | 9/2000 | Andoh et al. | |
| 6,161,130 A | 12/2000 | Horvitz et al. | |
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,721,721 B1 | 4/2004 | Bates et al. | |
| 6,751,789 B1 | 6/2004 | Berry et al. | |
| 6,772,346 B1 | 8/2004 | Chess et al. | |
| 6,842,861 B1 | 1/2005 | Cox et al. | |
| 6,886,099 B1 | 4/2005 | Smithson et al. | |
| 6,944,555 B2 | 9/2005 | Blackett et al. | |
| 6,952,779 B1 | 10/2005 | Cohen et al. | |
| 6,973,578 B1 * | 12/2005 | McIchionc | 713/188 |
| 7,024,403 B2 * | 4/2006 | Kyler | 707/3 |
| 2002/0035693 A1 | 3/2002 | Eyres et al. | |
| 2002/0038308 A1 | 3/2002 | Cappi | |
| 2002/0046207 A1 | 4/2002 | Chino et al. | |
| 2002/0073046 A1 | 6/2002 | David | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033587 A1 | 2/2003 | Ferguson et al. | |
| 2003/0061287 A1 | 3/2003 | Yu et al. | |
| 2003/0065926 A1 | 4/2003 | Schultz et al. | |
| 2003/0110280 A1 | 6/2003 | Brock et al. | |
| 2003/0110393 A1 | 6/2003 | Presotto et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1 | 9/2003 | Stolfo et al. | |
| 2003/0233352 A1 | 12/2003 | Baker | |
| 2004/0015554 A1 | 1/2004 | Wilson | |
| 2004/0039921 A1 | 2/2004 | Chuang | |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0220975 A1 | 11/2004 | Carpentier et al. | |

FOREIGN PATENT DOCUMENTS

| | | |
|---|---|---|
| EP | 1408393 A2 | 4/2004 |
| WO | WO99/15966 A1 | 4/1999 |

OTHER PUBLICATIONS

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>. U.S.A.

"Enterprise Protection Strategy" [online] Trend Micro Inc. [retrieved Dec. 3, 2002] Retrieved from the Internet: <URL: http://www.trendmicro.com/en/products/eps/features.htm>. Tokyo, Japan.

"How to Test Outbreak Commander", : Trend Micro Inc., Aug. 2002, pp. 1-13, Cupertino, CA.

Bontchev, Vesselin, "Possible Macro Virus Attacks and How to Prevent Them", Computers & Security, vol. 15, No. 7, pp. 595-626, 1996, Reykjavik, Iceland.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

Bolosky et al., "Single Instance Storage in Windows 2000", downloaded from the Internet on Oct. 11, 2002 at http://research.Microsoft.com/sn/Farsite/WSS2000.pdf.

* cited by examiner

ANTIVIRUS SCANNING IN A HARD-LINKED ENVIRONMENT

TECHNICAL FIELD

This invention pertains to the field of detecting malicious computer code in a computer file, particularly a file having multiple hard links (file names).

BACKGROUND ART

The invention will be illustrated in conjunction with NTFS (New Technology File System). NTFS is present in every NT and higher operating system manufactured by Microsoft Corporation. In NTFS, the attributes of a file 2 within a computer 10 (see FIG. 1) are stored in alternate data streams. A file 2 is a composition of many streams. In NTFS, any data stream can have multiple alternate data streams associated therewith.

NTFS 5.0 (and above) supports multiple hard links 1. A "hard link 1" is a pointer to the file 2 that comprises, at a minimum, the file name. The hard link may comprise the full path name including the file name. Since there can be multiple hard links 1, any file 2 can have multiple file names, even though there is but one physical version of the file 2. Two or more of the file names can point to the same file 2 data, but be located in the same or different directories. FIG. 1 shows an example in which there are three hard links 1 to file 2. Modifying file via any one of the hard links 1 changes the underlying data pointed to by all of the hard links 1.

NTFS considers all file names to be hard links 1 to the file in question, but most files 2 have just one hard link 1 associated with that file 2. An NTFS file 2 is deleted when all hard links 1 to it are removed, i.e., when the last hard link 1 is removed. This means that a first hard link 1 (1) could be created for file 2 in a first directory, a second hard link 1 (2) could be created for the file 2 in another directory, the first hard link 1 (1) could be deleted, and the second hard link 1 (2) would still exist.

Other operating systems also support hard links, e.g., UNIX (in which they are called hard links) and OS2 (in which they are called shadows).

Antivirus scanners often make optimization decisions based upon the path or extension of a file 2. For example, if an ostensibly temporary file having the extension .tmp is opened, the antivirus scanner may decline to scan the contents of the file 2, because a .tmp file is not deemed by the antivirus scanner to be executable. However, if that .tmp file name is actually a hard link 1 (2) to an existing .exe file 2, modifying the .tmp file actually modifies the .exe file as well. In this scenario, the antivirus scanner could be lulled into not scanning a file 2 for the presence of malicious code when it should be scanning the file 2. This can result in computer 10 being harmed by the malicious code. As used herein, "malicious code" means any computer code that enters the computer 10 without an authorized user's knowledge and/or without an authorized user's consent. Thus, "malicious code" can include viruses, worms, and Trojan horses. As used herein, the term "antivirus scanner" is used in the broad sense, so that such scanner can detect all types of malicious code, including worms and Trojan horses as well as viruses.

An NTFS file 2 contains the number of hard links 1 to the file 2, but it does not identify the hard links 1 any further. Thus, when a user accesses file 2 via the second hard link 1 (2), this user knows that there are two other hard links 1 (1) and 1 (3), but is not told what they are. The only way for the user to find the other hard links 1 (1) and 1 (3) is to note the serial number that is included in each NTFS file 2, and then to do a search for all of the files 2 in the computer 10 matching that serial number. That is an extremely time consuming and cumbersome operation, and is the problem addressed by the present invention.

Bolosky et al., "Single Instance Storage in Windows 2000", downloaded from the Internet on Oct. 11, 2002 at http://research.Microsoft.com/sn/Farsite/WSS2000.pdf, discloses the creation of backpointer tables in cases where a single file has multiple hard or symbolic links pointing to the file. Unlike the present invention, where the contents of file 2 do not change, an attempt to modify the contents of the target file in the reference results in a new version of the target file being created.

DISCLOSURE OF INVENTION

Computer-implemented methods, apparati, and computer-readable media for detecting malicious computer code in a file (2) associated with a computer (10). A method of the present invention comprises the steps of determining whether there is more than one hard link (1) to the file (2); and when there is more than one hard link (1), ascertaining the identities of all the hard links (1), and performing an antivirus scan on the file (2) based upon the hard link(s) (1) having the most restrictive scanning criteria of all the hard links (1), or upon the union of scanning criteria amongst all the hard links (1).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
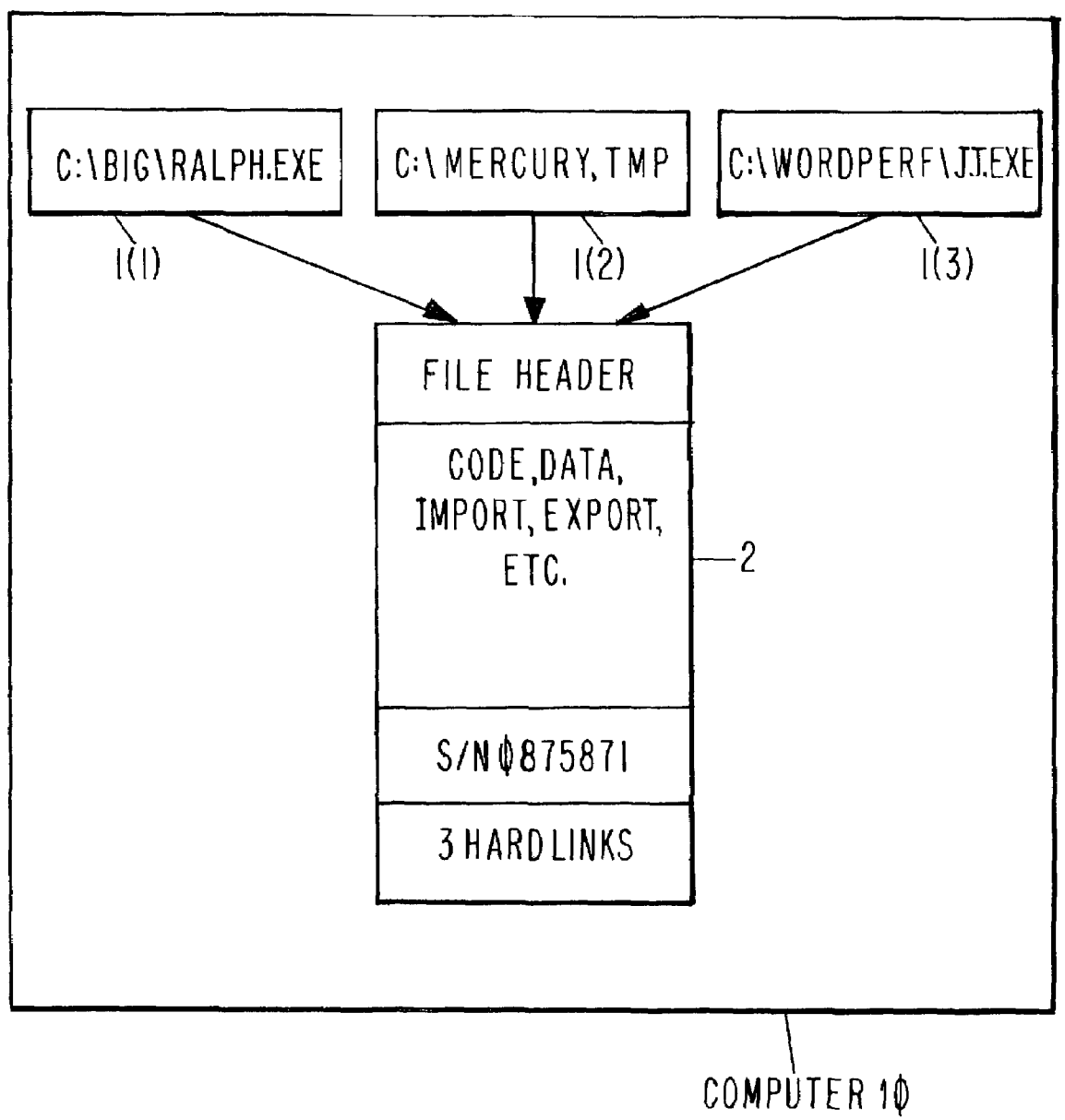
FIG. 1 is part of the prior art, inasmuch as it illustrates a conventional NTFS file system.
Figure 2:
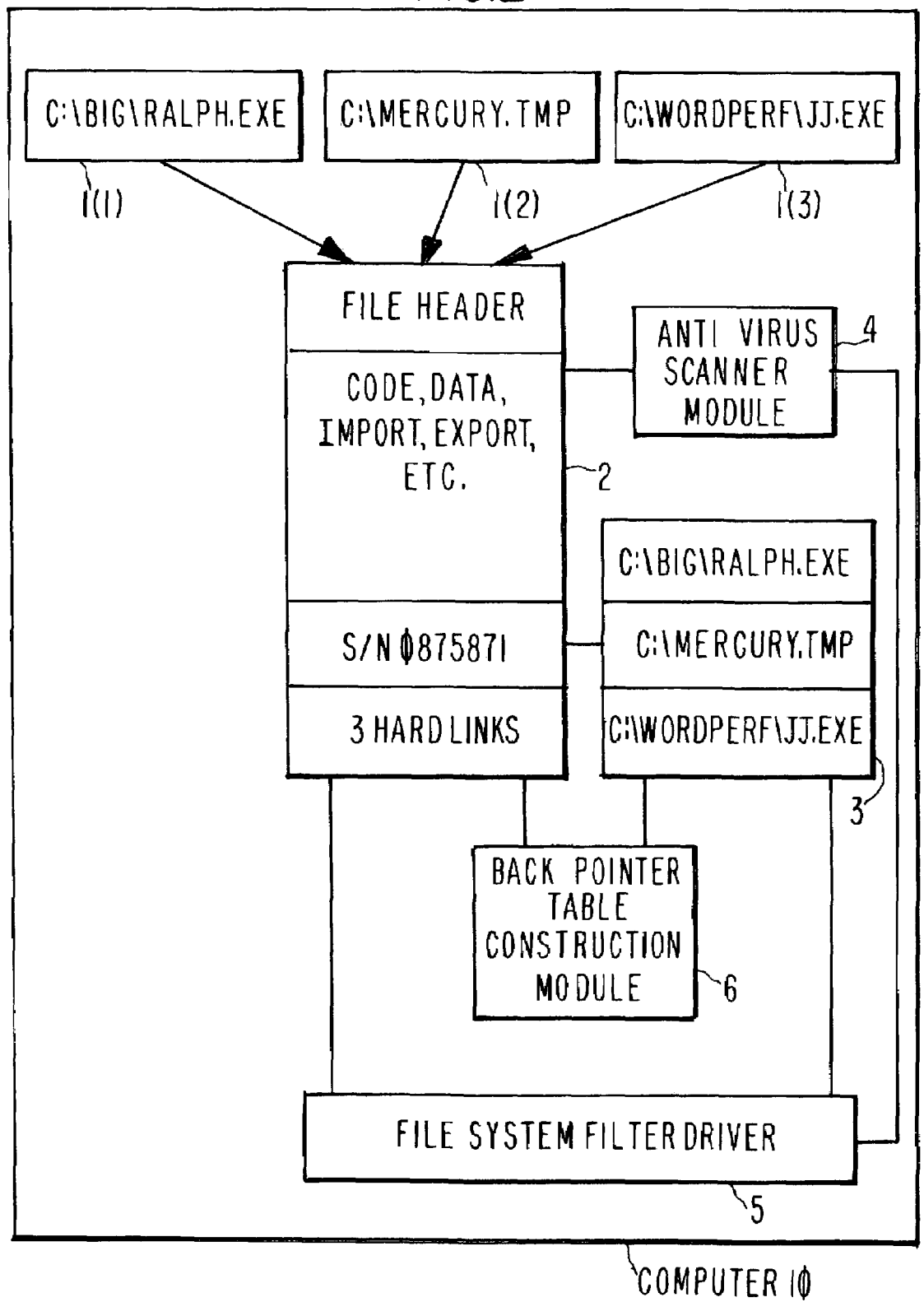
FIG. 2 is a block diagram illustrating an embodiment of the present invention.

FIG. 2 illustrates apparatus that can be used to implement the present invention. Hard link backpointer table 3 is associated with each file 2 having more than one hard link 1. In NTFS, backpointer table 3 is an alternate date stream. In other operating systems, table 3 can be any table, catalogue, or file. An antivirus scanner module 4 has access to each file 2 on the computer 10, and serves the function of performing scans of file 2 to detect the presence of malicious code contained within the file 2. A file system filter driver 5 has access to each file 2 and is coupled to antivirus scanner module 4. As used throughout this specification including claims, "coupled" is used in the broad sense, and means "directly coupled", "indirectly coupled", "in communication with", "connected to", "physically coupled", "logically coupled", etc. Driver 5 is typically a computer program that is always running on the computer 10 and hooks to the operating system functionality, e.g., via APIs (Application Programming Interfaces). An example of a suitable file system driver 5 is Symevent manufactured by Symantec Corporation of Cupertino, Calif.

A backpointer table construction module 6 has access to each file 2 and to the file's accompanying backpointer table 3. Modules 3, 4, 5, and 6 can be implemented in hardware, firmware, and/or software, or any combination thereof, and are normally implemented in software.

Figure 3:
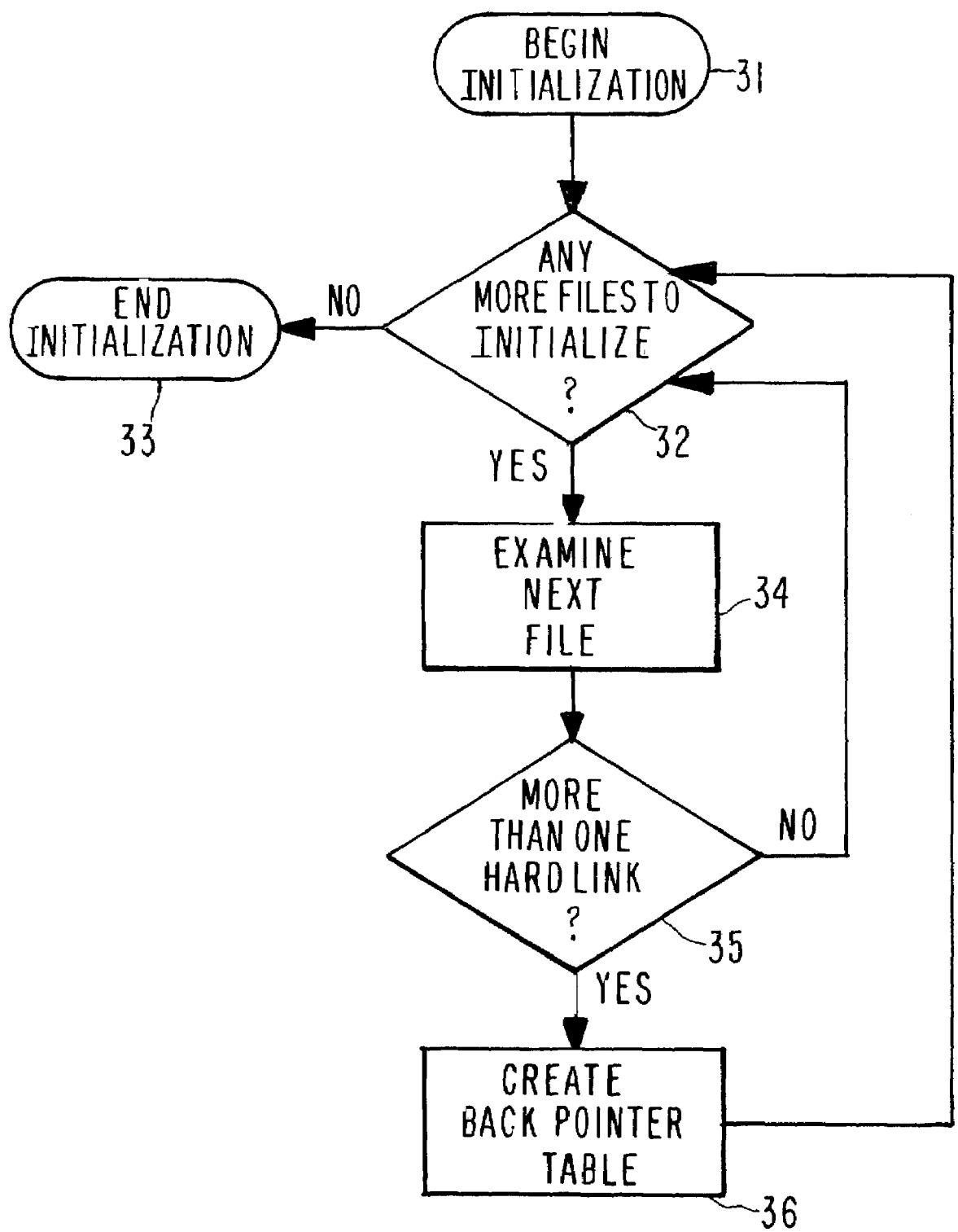
FIG. 3 is a flow diagram illustrating the initialization of backpointer table 3 of the present invention.

FIG. 3 illustrates the initialization of the backpointer table 3. The method of FIG. 3 can be performed every time the computer 10 is initialized, i.e., when the user of computer 10 first implements the present invention thereon. Alternatively, the method of FIG. 3 can be performed any time the user desires, or when there is reason to believe that backpointer table 3 may have become inconsistent with the file system. For example, this can occur when driver 5 determines that the file system was modified when driver 5 was disabled for a period of time.

The initialization of table 3 begins at step 31. At step 32, construction module 6 asks whether there are any more files 2 to be subjected to the initialization routine. If not, the method ends at step 33. If there are more files 2 to be processed, the method proceeds to step 34, where construction module 6 selects the next file 2 to be processed. At step 35, construction module 6 asks whether there is more than one hard link 1 to file 2. This determination is made by construction module 6 examining the section of the file 2 that contains the number of hard links 1. If this section divulges that there is just one hard link 1, the method reverts to step 32. If, on the other hand, there is more than one hard link 1, the method proceeds to step 36, where construction module 6 creates a backpointer table 3, and links table 3 to file 2. Construction module 6 can create table 3 by means of determining the serial number of file 2 and searching through all the files 2 on the computer for entries having the same serial number. Each entry of table 3 should preferably contain the full path name for each hard link 1. This is useful, because decisions made by antivirus scanner 4 might require knowledge of the directory path and/or extension. The method then reverts to step 32.

Table 3 should be updated by construction module 6 each time a hard link 1 to file 2 is added, deleted, or renamed. File system filter driver 5 (or a client of driver 5) can be programmed to monitor when a hard link 1 is added, deleted, or renamed; and inform construction module 6 accordingly.

Figure 4:
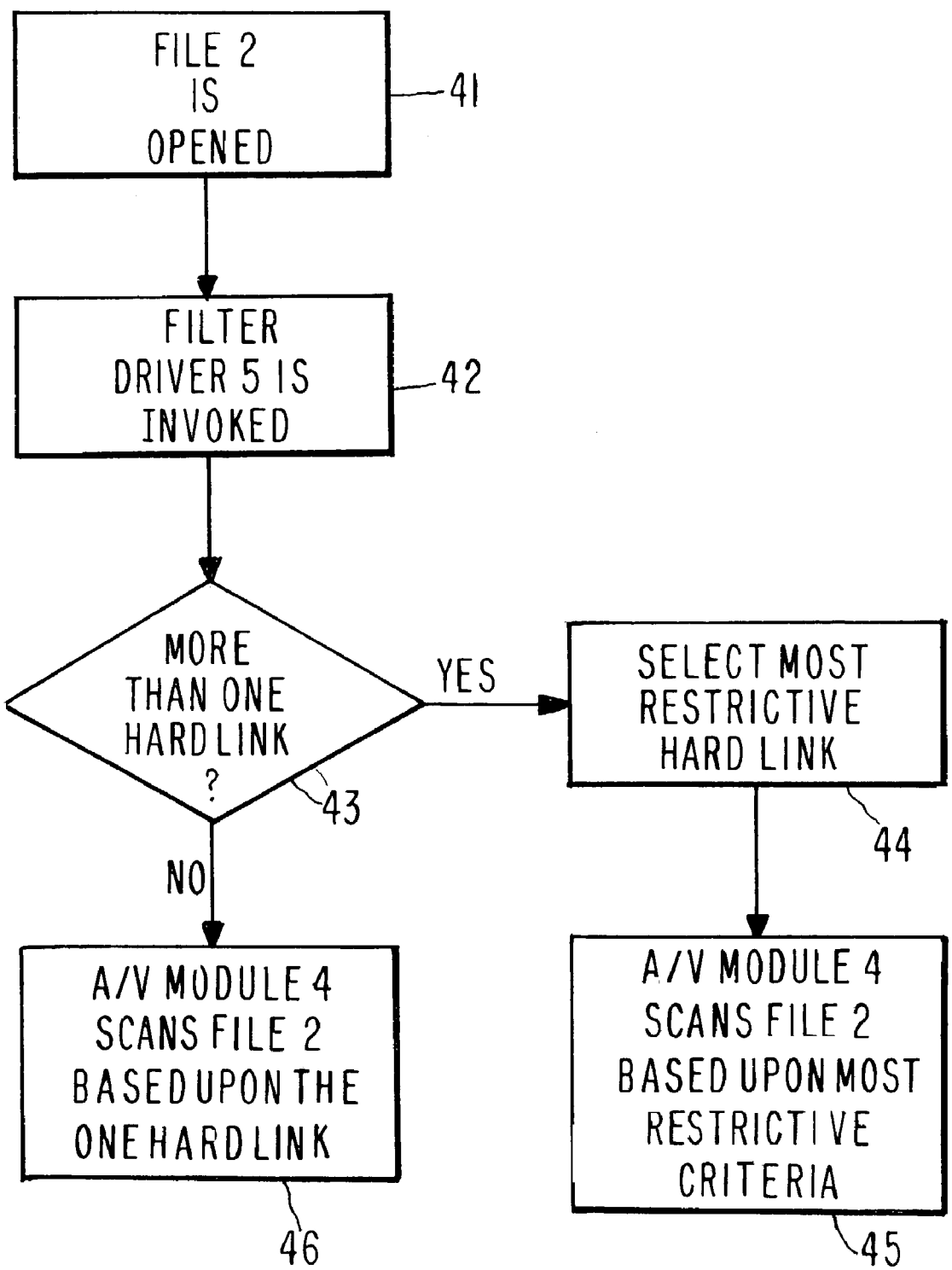
FIG. 4 is a flow diagram illustrating operation of an embodiment of the present invention.

FIG. 4 illustrates how the present invention is able to perform a more complete antivirus scan than methods of the prior art. At step 41, a file 2 is opened. At step 42, file system filter driver 5 notices that file 2 is opened. This may happen, e.g., because driver 5 has been programmed to activate whenever any file 2 on computer 10 is opened. At step 43, driver 5 determines whether there is more than one hard link 1 to file 2. This determination can be made by means of driver 5 examining the section of file 2 that indicates the number of hard links 1 to file 2. If there is just one hard link 1, step 46 is entered, where driver 5 instructs antivirus scanner module 4 to scan file 2 in a normal fashion based upon criteria contained in the hard link 1. The criteria may be ascertained from just hard link 1, or from hard link 1 in combination with other information. For example, the scanning criteria may be based simply upon the file name, or upon the file name extension (.tmp or .exe). Alternatively, the scanning criteria may be based upon the extension in combination with information contained in the header of the file 2.

If step 43 discloses that there is more than one hard link 1 to the file 2, driver 5 examines (at step 44) table 3 to determine the identity of the hard link 1 or hard links 1 having the most (in relation to all the hard links 1 associated with that file 2) restrictive scanning criteria associated therewith. This determination is made on the basis of a set of preselected rules. For example, one such rule may be that a file 2 having an extension of .tmp does not have to be scanned by antivirus scanner 4, whereas a file 2 having an extension .exe does have to be scanned. In an alternative embodiment, antivirus scanner 4, rather than driver 5, performs step 44.

Finally, at step 45, antivirus scanner 4 performs the scan based upon said most restrictive criteria, based upon instructions issued by driver 5.

In an alternative embodiment, instead of performing steps 44 and 45, when the answer to the question posed in step 43 is "yes", antivirus module 4 scans file 2 based upon the union of scanning criteria amongst all the hard links 1. The union of scanning criteria can be determined by antivirus scanner 4 or by driver 5.

Figure 5:
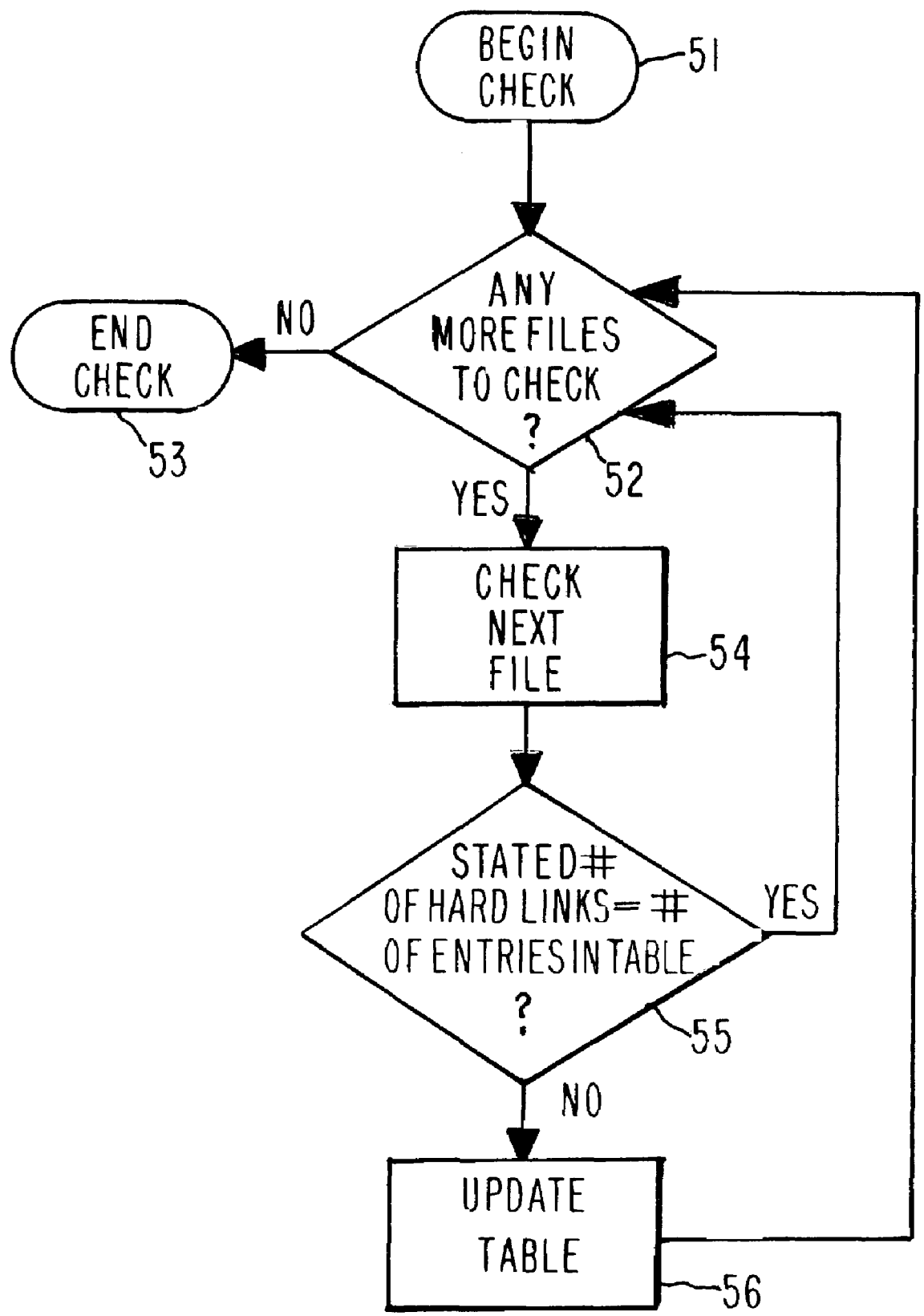
FIG. 5 is a flow diagram illustrating an integrity check feature of the present invention.

FIG. 5 illustrates a method by which the computer 10 user can perform an integrity check upon the contents of table 3. This integrity check can be performed periodically, e.g., weekly, or whenever the user desires, e.g., when the user suspects that table 3 may have been corrupted.

The method begins at step 51. At step 52, construction module 6 asks whether there are any more files 2 to be checked. If there aren't any, the method ends at step 53. If there are files 2 still to be checked, the method proceeds to step 54, where construction module 6 selects the next file 2. At step 55, module 6 determines whether the stated (in the section of file 2 that gives the number of hard links 1) number of hard links 1 is equal to the number of entries in table 3 associated with that particular file 2. If these numbers are the same, the method reverts to step 52. If, on the other hand, these numbers are different, the method proceeds to step 56, where module 6 updates table 3. This updating can be performed in the same way that module 6 performs step 36 of FIG. 3. Then the method again reverts to step 52.

In an alternative embodiment of the present invention, any search module associated with the computer 10 that searches for files 2 by file name or portion of file name can be modified to look for not just the normal items that the search module has been programmed to look for, but also the information contained in backpointer table 3. This can enhance the usability of the search module. An example of such a search module is the search module known as Explorer, which is present on Windows operating systems. Say, for example, that the user asks Explorer to look for all files having extension .exe. If Explorer has been enhanced as described herein, Explorer will give the user citations to not just links from .exe but from other hard links 1 to the file 2 that don't have an extension of .exe.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

The invention claimed is:

1. A computer-implemented method for detecting malicious computer code in a file associated with a computer, said method comprising the steps of:

determining whether there is more than one hard link to the file; and when there is more than one hard link:
ascertaining the identities of all the hard links; and
performing an antivirus scan on the file based upon the hard link(s) having the most restrictive scanning criteria of all the hard links to detect malicious computer code.

2. The method of claim 1 wherein each hard link comprises a file name.

3. The method of claim 1 wherein each hard link comprises a full path name including a file name.

4. The method of claim 1 wherein the scanning criteria are based upon a file name in combination with other information.

5. The method of claim 4 wherein said other information comprises information contained in a header of the file.

6. The method of claim 1 wherein the ascertaining comprises accessing a backpointer table associated with the file.

7. The method of claim 6 wherein the backpointer table comprises full path names for all hard links to the file.

8. The method of claim 6 wherein the backpointer table is stored as an alternate data stream associated with the file.

9. The method of claim 6 wherein the backpointer table has been constructed by a backpointer table construction module.

10. The method of claim 6 wherein the backpointer table is updated every time a file is subjected to an operation from the group of operations comprising addition of a file, deletion of a file, and renaming of a file.

11. The method of claim 6 wherein a search module associated with the computer is modified to access the backpointer table.

12. The method of claim 6 wherein the backpointer table is created when the computer is initialized.

13. The method of claim 6 wherein the backpointer table is re-initialized when there is reason to believe that the backpointer table may have become inconsistent.

14. The method of claim 6 further comprising the step of: performing an integrity check on the backpointer table.

15. The method of claim 14 wherein the step of performing the integrity check comprises the substeps of:
for each file on the computer, determining whether a first value stored within the file representative of a number of hard links associated with the file is equal to a second value representative of the number of entries in the backpointer table associated with the file; and
when the first value is unequal to the second value, updating the backpointer table.

16. The method of claim 1 wherein the determining step is performed every time the file is opened.

17. The method of claim 1 wherein the ascertaining is performed by a file system filter driver that is always running on the computer.

18. A computer-readable medium containing computer program instructions for detecting malicious computer code in a file associated with a computer, comprising:
a backpointer table construction module coupled to the file, said module adapted to construct a backpointer table for the file when the file has more than one hard link;
an antivirus scanner coupled to the file and adapted to scan the file for the presence of malicious computer code; and
a file system filter driver coupled to the file and to the antivirus scanner, said driver instructing the antivirus scanner to examine the backpointer table when the file has more than one hard link.

19. A computer-readable medium containing computer program instructions for detecting malicious computer code in a file associated with a computer, said instructions performing the steps of:
determining whether there is more than one hard link to the file; and when there is more than one hard link:
ascertaining the identities of all the hard links; and
performing an antivirus scan on the file based upon the hard link(s) having the most restrictive scanning criteria of all the hard links to detect malicious computer code.

20. The computer-readable medium of claim 19 wherein each hard link comprises a file name.

21. The computer-readable medium of claim 19 wherein each hard link comprises a fUll path name including a file name.

22. The computer-readable medium of claim 19 wherein the scanning criteria are based upon a file name in combination with other information.

23. The computer-readable medium of claim 22 wherein said other information comprises information contained in a header of the file.

24. The computer-readable medium of claim 19 wherein the ascertaining comprises accessing a backpointer table associated with the file.

25. The computer-readable medium of claim 24 wherein the backpointer table comprises full path names for all hard links to the file.

26. The computer-readable medium of claim 24 wherein the backpointer table is stored as an alternate data stream associated with the file.

27. The computer-readable medium of claim 24 wherein the backpointer table has been constructed by a backpointer table construction module.

28. The computer-readable medium of claim 24 wherein the backpointer table is updated every time a file is subjected to an operation from the group of operations comprising addition of a file, deletion of a file, and renaming of a file.

29. The computer-readable medium of claim 24 wherein a search module associated with the computer is modified to access the backpointer table.

30. The computer-readable medium of claim 24 wherein the backpointer table is created when the computer is initialized.

31. The computer-readable medium of claim 24 wherein said instructions further comprise the step of:
performing an integrity check on the backpointer table.

32. The computer-readable medium of claim 31 wherein the step of performing the integrity check comprises the substeps of:
for each file on the computer, determining whether a first value stored within the file representative of a number of hard links associated with the file is equal to a second value representative of the number of entries in the backpointer table associated with the file; and
when the first value is unequal to the second value, updating the backpointer table.

33. The computer-readable medium of claim 19 wherein the determining step is performed every time the file is opened.

34. The computer-readable medium of claim 19 wherein the ascertaining is performed by a file system filter driver that is always running on the computer.

35. A computer-implemented method for detecting malicious computer code in a computer, the method comprising:
- identifying a file on a storage device associated with the computer, the file having a plurality of hard links, each hard link associated with a file name;
- determining a plurality of file names associated with the plurality of hard links;
- ascertaining a set of scanning criteria responsive at least in part to the plurality of file names, where ascertaining the set of scanning criteria comprises:
  - ascertaining scanning criteria for each of the plurality of file names, and
  - forming the set of scanning criteria from the most restrictive scanning criteria of the scanning criteria for each of the plurality of file names; and
- scanning the file responsive to the set of scanning criteria to detect the presence of malicious computer code in the file.

36. The method of claim 35, wherein a file name of the plurality of file names comprises a file name extension, and wherein ascertaining scanning criteria for each of the plurality of file names ascertains the criteria responsive to the file name extension.

* * * * *

UNITED STATES PATENT AND TRADEMARK OFFICE
CERTIFICATE OF CORRECTION

| | | |
|---|---|---|
| PATENT NO. | : 7,260,847 B2 | Page 1 of 1 |
| APPLICATION NO. | : 10/280663 | |
| DATED | : August 21, 2007 | |
| INVENTOR(S) | : William E. Sobel and Bruce McCorkendale | |

It is certified that error appears in the above-identified patent and that said Letters Patent is hereby corrected as shown below:

Column 6, Claim 21, Line 15, please delete "fUll" and insert -- full --.

Signed and Sealed this

Twentieth Day of November, 2007

JON W. DUDAS
*Director of the United States Patent and Trademark Office*